(12) United States Patent
Beckett

(10) Patent No.: US 7,597,120 B2
(45) Date of Patent: Oct. 6, 2009

(54) PYTHONS

(75) Inventor: Robert Prentice Beckett, County Down (GB)

(73) Assignee: Valpar Industrial limited, Bangor (GB)

( * ) Notice: Subject to any disclaimer, the term of this patent is extended or adjusted under 35 U.S.C. 154(b) by 764 days.

(21) Appl. No.: 11/201,725

(22) Filed: Aug. 11, 2005

(65) Prior Publication Data

US 2006/0032545 A1 Feb. 16, 2006

(30) Foreign Application Priority Data

Aug. 14, 2004 (GB) ................... 0418206.9
Dec. 20, 2004 (GB) ................... 0427773.7

(51) Int. Cl.
*F16L 9/14* (2006.01)

(52) U.S. Cl. ............... 138/149; 138/111; 138/110; 138/124

(58) Field of Classification Search ............... 138/149, 138/123, 124, 140, 129, 130
See application file for complete search history.

(56) References Cited

U.S. PATENT DOCUMENTS 2,585,054 A * 2/1952 Stachura .................. 174/36
2,936,259 A * 5/1960 Childers ................... 138/149
3,105,871 A * 10/1963 Eager, Jr. ................. 174/105 R
3,355,572 A * 11/1967 Chrow ..................... 392/468
3,529,632 A * 9/1970 Johns ...................... 138/111
3,565,118 A * 2/1971 Stearns .................... 138/112
4,303,105 A * 12/1981 Rohner .................... 138/149
4,317,000 A * 2/1982 Ferer ....................... 174/70 R
4,754,685 A * 7/1988 Kite et al. ................ 87/9
5,725,028 A * 3/1998 Cleland ................... 138/149
6,003,559 A * 12/1999 Baker ..................... 138/108
6,610,399 B1 * 8/2003 Crigler ..................... 428/375
6,963,031 B2 * 11/2005 Gladfelter et al. ......... 174/74 A

FOREIGN PATENT DOCUMENTS

| DE | 94 07 409 U1 | 7/1994 |
| EP | 0 560 404 A1 | 9/1993 |
| EP | 0 640 788 A2 | 6/1994 |
| EP | 0 892 207 A | 1/1999 |
| EP | 1 239 205 A2 | 2/2002 |
| EP | 1 239 205 A3 | 2/2002 |
| GB | 2 166 833 A | 5/1986 |
| WO | WO 01/18316 A1 | 3/2001 |
| WO | WO 03/068481 A | 8/2003 |

* cited by examiner

*Primary Examiner*—Patrick F Brinson
(74) *Attorney, Agent, or Firm*—Drinker, Biddle & Reath, LLP

(57) ABSTRACT

A liquid-conducting python has a plurality of liquid-conducting tubes surrounded by foam insulation. At least a portion of the outer surface of the foam insulation is patterned to form a segmented surface.

11 Claims, 1 Drawing Sheet

PYTHONS

Figure 1:
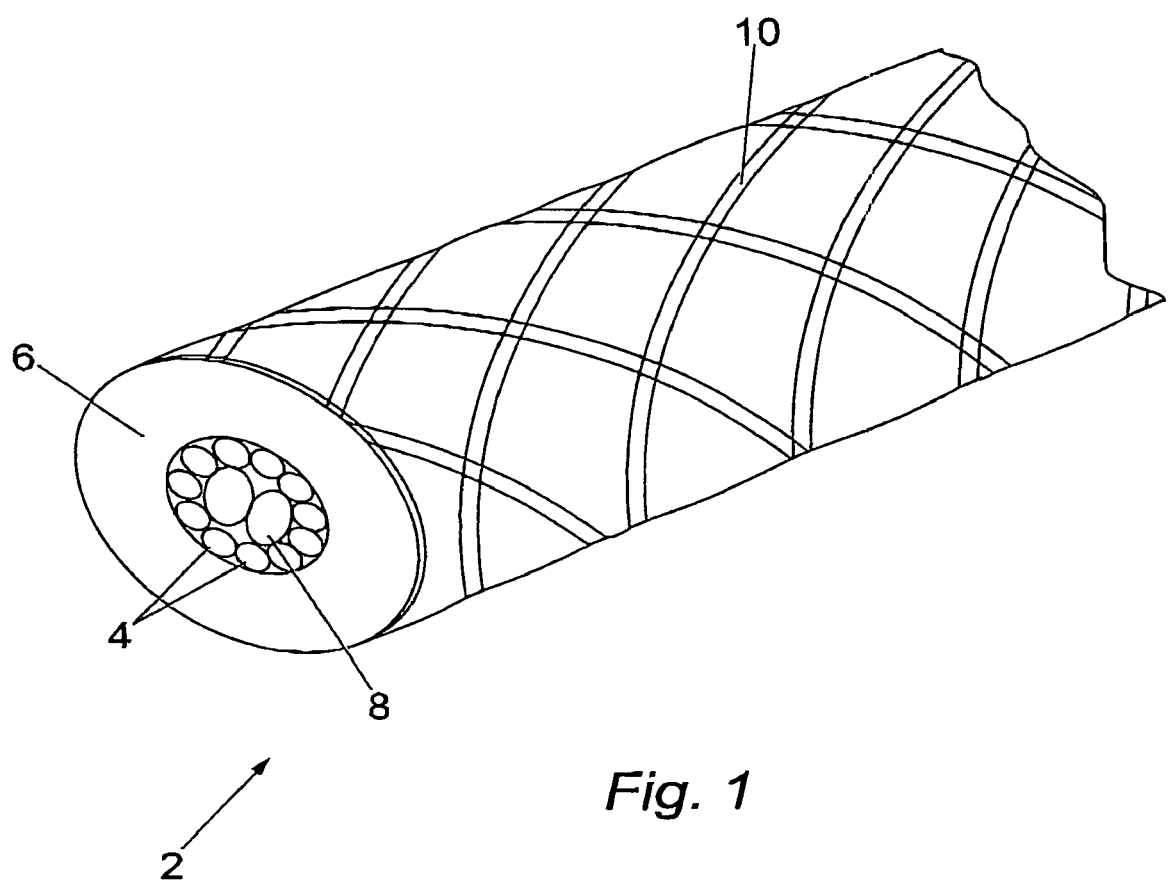

The present invention relates to improvements relating to pythons.

Pythons are products used in the beverage industry, although not limited thereto, for transferring drinks such as beers and lagers from kegs to bar taps.

In a common layout of many licensed premises, kegs of brew are stored in temperature controlled conditions, such as a cellar, and the brew is delivered through flexible tubes to the bar taps. Each brew must be separately and discreetly delivered to effect this, and to keep control over the temperature from the keg to the tap, the liquid-conducting tubes can be bundled together with one or more coolant or refrigerant tubes or lines, and this bundle of tubes surrounded by foam insulation. This collection of tubes or foam insulation in known in the art as a python.

An example of forming a python is shown in UK Patent No 2166833.

Around the insulation is commonly added a final layer of PVC tape or PVC or other polymer coating, so as to provide protection to the insulation, and to provide a smooth and nicely finished product look when straight.

This outer layer is tightly fitted. However, this has led to several disadvantages, generally based on how pythons are used. One issue in the use of pythons is that they are located and have to be pulled through holes and ducts in the walls and floors of bars and restaurants, and the stiff and tight nature of the outer layer results in the effort of pulling a python through these ducts and around various corners and bends to be very high, often causing injury. The effort is increased where a second python is intended to be located along the same pathway, and thus must be pulled against the surface of the first python. The nature of this effort leads to increased installation time, which is not desired.

A further issue with current pythons is that when these are bent into a tight radius, as is often desired in the intended but hidden pathway of the python through a bar or restaurant, the outer layer can ripple, with large ripples or folds providing the opportunity for condensation to collect in the fold on the python, or for heat gain.

One further disadvantage with current pythons is that, because of the nature of the rubber and foam insulation, they can easily deform by being crushed, especially if left in storage for a long time. The deformation could be by their own weight if stored in a coiled manner, which is naturally also the most convenient method of transporting such products. Thus, a product delivered to a customer but not immediately used or left in storage, can render the product of bad quality.

It is an object of the present invention to obviate these disadvantages.

Thus, according to one aspect of the present invention, there is provided a liquid-conducting python having a plurality of liquid-conducting tubes surrounded by foam insulation, wherein at least a portion of the outer surface of the foam insulation is patterned to form a segmented surface. Preferably substantially the whole outer surface of the foam insulation is patterned to form a segmented surface.

By forming a segmented surface, there is a significant reduction of friction in the passing of one python over another, in a manner similar to the scales of a snake. Secondly, the segmented pattern provides pre-formed crease lines, which are ready to aerate the outer surface of the python when arched. Thirdly, the segmented nature of the python provides increased strength to the python, and thus better crush resistance over time.

The pattern can be any regular or irregular shape, surface or design. It can be applied by a pattern forming process to the insulation, such as embossing, or be formed on the insulation by one or more separate means.

In a preferred embodiment the segmented surface is formed on the surface of the foam insulation by braiding. Preferably the braiding is in the form of thin cord, line or thread-like material provided in a crossed or weaved manner around the foam insulation.

The python can deliver any number or nature of liquids, including but not limited to beverages such as beers and lagers.

Preferably, the python has an outer layer such as a coating formed by tape or a continuous coating process. The layer could be added prior to patterning of the insulation, although preferably it is added after patterning.

The insulation may be partly, substantially or completely patterned, more preferably completely patterned.

According to a second aspect of the present invention there is provided a process for forming a liquid-conducting python comprising the steps of surrounding a plurality of liquid-conducting tubes with a layer of foam insulation, wherein at least a portion of the outer surface of the insulation is patterned to form a segmented surface. Preferably substantially the whole outer surface of the layer of foam insulation is patterned to form a segmented surface.

The segmented surface may be applied to the insulation layer, either before or after applying the layer of insulation around the plurality of liquid-conducting tubes, by a pattern forming process to the layer of insulation, such as embossing.

Preferably the segmented surface is formed by applying a braid of thin cord, line or thread-like material in a crossed or weaved manner around the layer of insulation. The braiding can be applied by a braiding machine, which machines are well known in the art.

The process may further comprise the step of forming an outer layer or covering over the layer of insulation. The outer layer may comprise tape, preferably formed from a suitable polymeric material such as PVC, or a continuous coating of a suitable polymeric material, such as PVC.

FIG. 1 is a cross-sectional perspective view of a python according to one embodiment of the present invention.

An embodiment of the present invention will now be described by way of example only, and with reference to the accompanying diagrammatic drawing, FIG. 1.

Referring to the drawing, there is shown a beverage-conducting python 2 having a plurality of beverage-conducting tubes 4 surrounded by a layer of foam insulation 6. With the beverage-conducting tubes 4 there are two refrigerant lines 8. Refrigerant passing up and down the refrigerant lines 8 provides a cooling effect to the beverage-conducting tubes 4. All the tubes 4, 8 can be surrounded by a first tape or coating prior to surrounding by the foam insulation 6. A method and manufacture of such a python is shown in UK Patent No 2166833.

Around the foam insulation 6, there are a number of lines of thread 10 formed in a criss-cross regular pattern around the foam insulation 6 in a manner which provides the outer surface of the foam insulation 6 in the form of a snake-skin pattern. The threads 10 can be added by a braiding machine in a manner well know in the art.

Around the braiding 10 and foam insulation layer 6, there would be applied a final outer layer, made from PCV or other suitable plastic tape, or a polymer coating. This layer is not shown in FIG. 1 for the purposes of illustrating the braiding. This layer, being tight-fitting, would take the braided-patterned shape thereunder. Thus, still providing the final python product with the patterned surface.

In use, the python 2 has a regularly patterned surface in the form of a snake skin pattern. This reduces the coefficient of friction against other surfaces, including the surfaces of other pythons, thereby making easier the installation of such pythons along their pathways from a location of beverages, such as kegs in a cellar, to their points of delivery, such as taps at a bar. The pathway can be significantly convoluted, with a number of twists and turns and bends, noting meanwhile that the pythons must be continuous and can therefore only be located by being fed from one end of the pathway to the other. With a number of beverage-conducting lines therein, and with expected thickness of the foam insulation, the pythons can be relatively inflexible compared with a single piece of tubing or wire. Thus, the ability to reduce friction in the locating of a first or a second python significantly eases their installation.

Secondly, the braiding provides increased strength around the foam insulation by being able to transfer load. Thus, the storage of a formed python where weight is resting thereon, such as a coiled python, does not result in crushing of the foam installation and therefore reduction of quality of the python.

Thirdly, lines created by the braiding provide initial crease or fold lines when the python is arched, as well as lines for the continuous aeration around the complete surface of the python over any bend or twist, thereby reducing the likelihood of a concealed or trapped surfaces, which can attract condensation, or not properly provide correct insulation.

The braiding acts to compress the foam insulation, and thus the tension with which the braiding is applied to the foam insulation can be used to reduce the overall diameter of the python to a required size. Accordingly, the present invention enables a single size of foam insulation to be used to create pythons having a variety of different overall diameters.

The application of braiding over the foam insulation also permits the use of foam insulation in the form of a flat sheet of material that can be wrapped around the beverage conducting tubes, the braiding holding the foam insulation in place. Such provides cost savings over known pythons which lack the securing effect of the braiding and thus require the use of pre-formed tubular foam insulation, such material being more costly to produce than a simple flat sheet.

The present invention provides a simple but effective improvement to pythons in a simple form of manufacture thereof, which will result in a number of significant advantages over existing pythons.

I claim:

1. A liquid-conducting python having a plurality of liquid-conducting tubes surrounded by foam insulation, wherein at least a portion of the outer surface of the foam insulation is patterned to form a segmented surface, wherein the segmented surface provides initial crease lines for enhancing flexibility of the python when the python is arched, and wherein the segmented surface provides a reduced contact surface for reducing friction between the python and other surfaces.

2. A liquid-conducting python as claimed in claim 1, wherein substantially the whole outer surface of the foam insulation is patterned to form a segmented surface.

3. A liquid-conducting python as claimed in claim 1, wherein the segmented surface is applied to the insulation by a pattern forming process to the insulation, such as embossing.

4. A liquid-conducting python as claimed in claim 1, wherein the segmented surface is formed on the surface of the foam insulation by braiding.

5. A liquid-conducting python as claimed in claim 4, wherein the braiding is in the form of thin cord, line or thread-like material provided in a crossed or weaved manner around the foam insulation.

6. A liquid-conducting python as claimed in claim 1, further comprising an outer layer formed by tape or a continuous coating process.

7. A liquid-conducting python as claimed in claim 1, wherein the segmented surface includes a pattern of raised portions and recessed portions, the raised portions resulting in reduced friction by reducing the contact surface of the python, the recessed portions enhancing flexibility by providing initial crease lines when the python is arched.

8. A liquid-containing python as claimed in claim 7, further comprising a braiding material applied under tension to at least a portion of the surface of the foam insulation such that the recessed portions are portions of the foam insulation compressed by the braiding material and the raised portions are portions of the foam insulation uncompressed by the braiding material.

9. A liquid-conducting python having a plurality of liquid-conducting tubes surrounded by foam insulation, wherein at least a portion of the outer surface of the foam insulation is formed into a segmented surface having raised portions and recessed portions, the raised portions resulting in reduced friction between the python and other surfaces by reducing the contact surface of the python, the recessed portions enhancing flexibility of the python by providing initial crease lines when the python is arched.

10. A liquid-conducting python as in claim 9, the python comprising a braiding material applied under tension to at least a portion of the surface of the foam insulation such that recessed portions are formed where the foam insulation is compressed by the braiding material and raised portions formed where the foam insulation is uncompressed by the braiding material.

11. A liquid-conducting python as in claim 9, wherein the recessed portions are embossed into the surface of the foam insulation and the raised portions are disposed between the recessed portions.

* * * * *